(No Model.)  4 Sheets—Sheet 1.

F. P. KEESEE.
CARPET SWEEPER.

No. 598,602.  Patented Feb. 8, 1898.

Witnesses
J. E. Lamson
J. F. Riggs

Inventor
Frank P. Keesee
by C. N. Rickes
his attorney.

(No Model.) 4 Sheets—Sheet 2.

F. P. KEESEE.
CARPET SWEEPER.

No. 598,602. Patented Feb. 8, 1898.

Witnesses

Inventor (No Model.) 4 Sheets—Sheet 3.

F. P. KEESEE.
CARPET SWEEPER.

No. 598,602. Patented Feb. 8, 1898.

Witnesses
Inventor
Frank P. Keesee
by C. N. Riches
his attorney (No Model.)

4 Sheets—Sheet 4.

F. P. KEESEE.
CARPET SWEEPER.

No. 598,602.   Patented Feb. 8, 1898.

Witnesses
J. E. Cameron
J. F. Riggs.

Inventor
F. P. Keesee
by C. H. Nichols
his attorney.

UNITED STATES PATENT OFFICE.

FRANK P. KEESEE, OF TORONTO, CANADA, ASSIGNOR OF ONE-HALF TO TAYLOR, SCOTT & CO., OF SAME PLACE.

CARPET-SWEEPER.

SPECIFICATION forming part of Letters Patent No. 598,602, dated February 8, 1898.

Application filed September 13, 1897. Serial No. 651,509. (No model.)

*To all whom it may concern:*

Be it known that I, FRANK P. KEESEE, a citizen of the United States, residing in the city of Toronto, in the county of York and Province of Ontario, Canada, have invented certain new and useful Improvements in Carpet-Sweepers; and I hereby declare that the following is a full, clear, and exact description of the same.

This invention relates to certain new and useful improvements in carpet-sweepers, and relates more particularly to the arrangement, location, and action of the sweeping brush or brushes and the location of the dust-pan or dust-collector in relation to the brushes; and the invention consists, essentially, of the device hereinafter more fully set forth, and more particularly pointed out in the claims.

Figure 1:
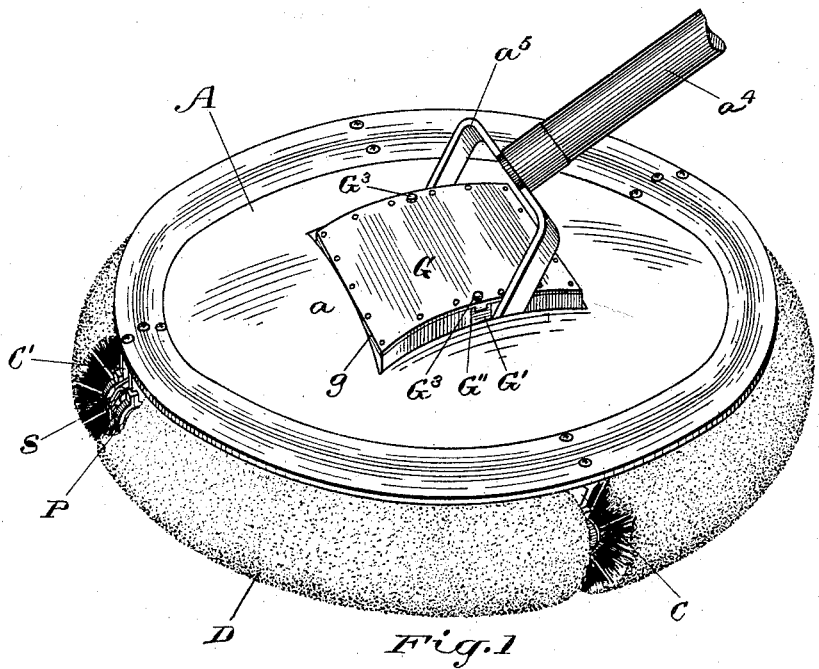
Figure 2:
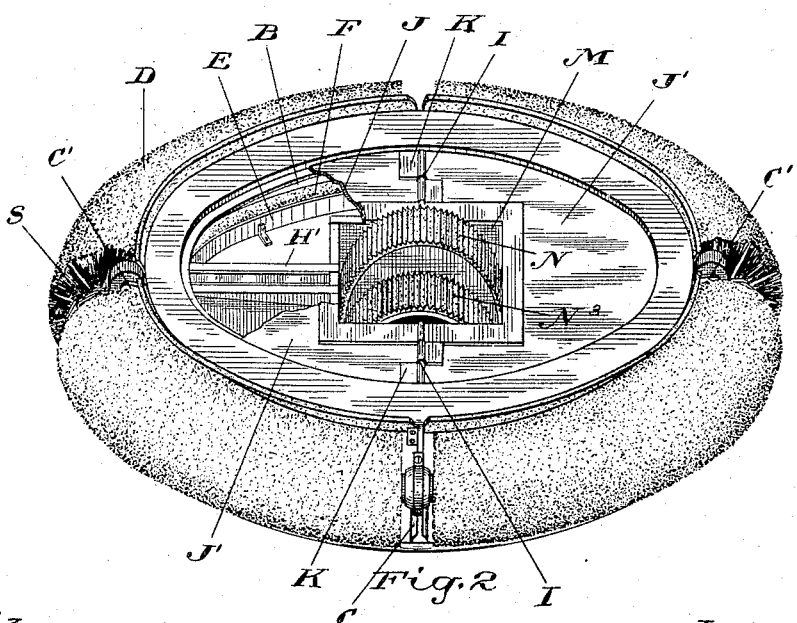
Figure 3:
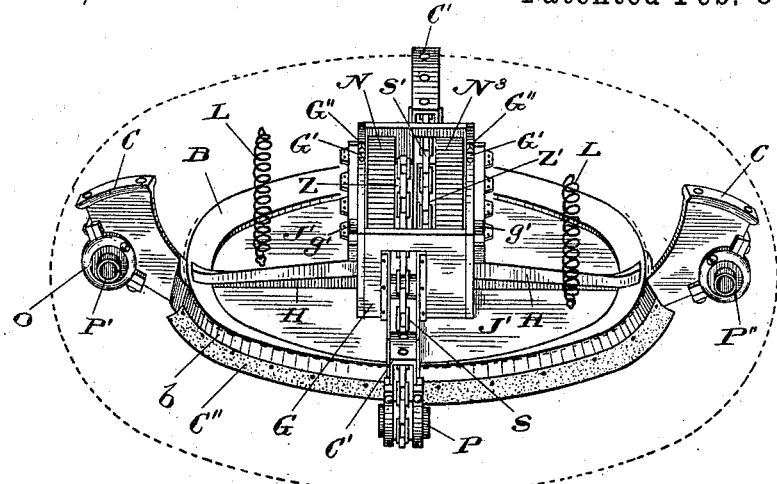
Figure 4:
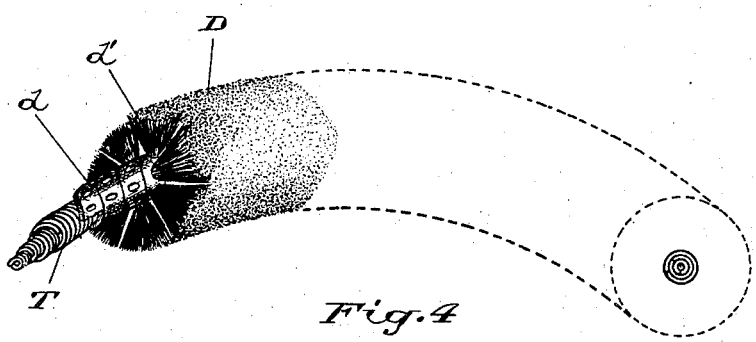
Figure 5:
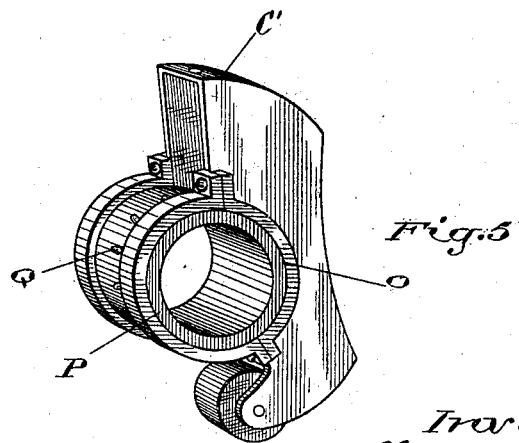
Figure 6:
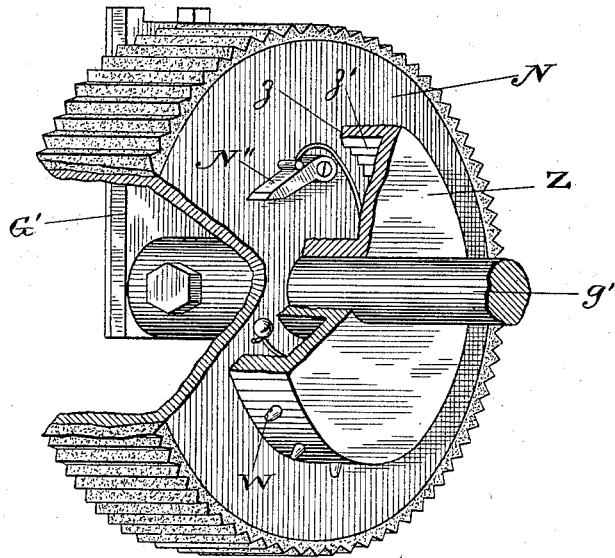
Figure 7:
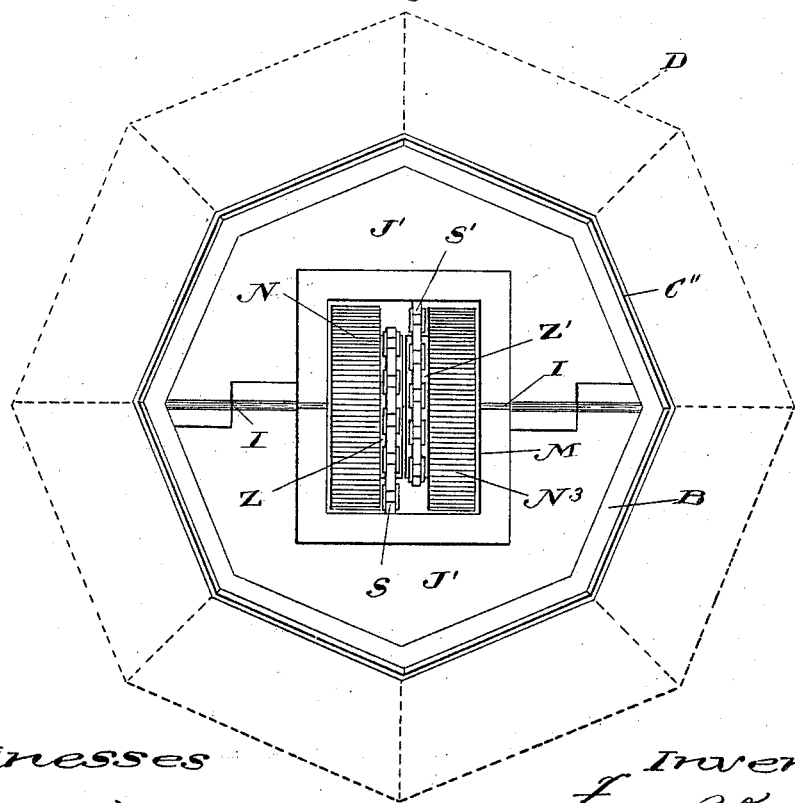
Figure 8:
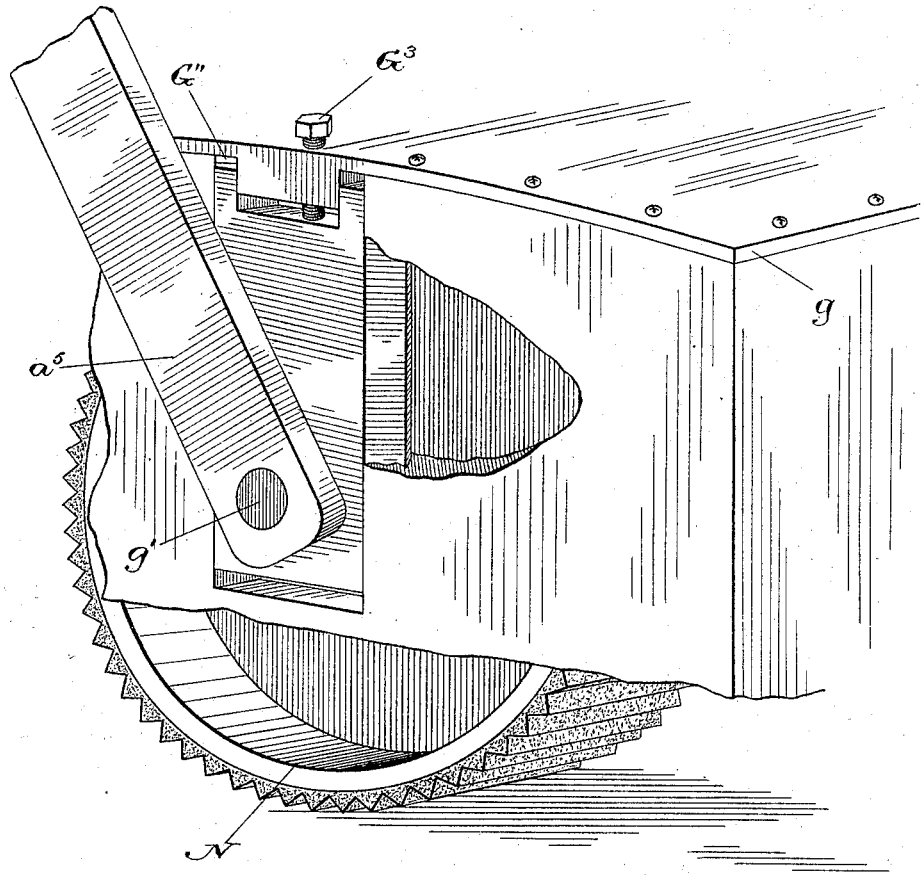

In the drawings, Figure 1 is a perspective view of the carpet-sweeper, looking at it from the top. Fig. 2 is a similar view from the bottom. Fig. 3 is a perspective view with the top and brush removed, showing only the operating mechanism. Fig. 4 is a view of part of the brush. Fig. 5 is a view of one of the bearings and bracket. Fig. 6 is a view of one of the wheels from which the brushes are operated, partly broken away. Fig. 7 is a plan view of the bottom of an alternative form of sweeper, showing the brushes in dotted lines. Fig. 8 is a view showing the means for adjusting the elevation of the driving-wheels.

Like letters of reference refer to like parts throughout the specification and drawings.

A represents the frame or top of the carpet-sweeper. As shown in Fig. 1 of the drawings, the frame is of a substantially circular shape, having its central part $a$ slightly concavo-convex. In Fig. 7 the frame is shown to be substantially octagonal. I do not confine myself to any particular shape or size of frame, nor do I confine myself to making it of any particular material.

B represents an annular band suspended from the under side of the frame A by four hangers C C C' C', respectively arranged in two sets, the hangers of each set being diametrically opposed. The outer face $b$ of the band B is beveled, and connected to the lower edge of this beveled face is an annular apron C'', of rubber or other suitable material. The lower edge of the apron C'' is on substantially the same plane as the lower edge of the brush D, while the under side of the band B is slightly above the lower face of the brush, in order that it will not impede the free action of the sweeper when traveling over the surface swept by it. The band B forms part of the dust-pan or dust-collector and is of sufficient depth to prevent the escape therefrom of the contents.

Suspended from the under side of the frame A is a flange or broad band E, the lower edge of which is opposed to the top of the band B. Between the lower edge of the flange E and the top of the band B is an opening F of sufficient width to admit the dust, &c., swept into the dust-collector by the brush or brushes of the sweeper.

G represents a supplemental frame centrally connected to the frame A by means of four radial arms H H H' H', respectively arranged in two sets, the arms of each set being oppositely opposed and connected to the band B at diametrically opposite points. The under side of the band B, the bottom of the edges of the sides of the supplemental frame G, and the under side of the arms H H' are all in the same plane. The top of the supplemental frame G projects slightly above the top of the frame A and is connected to the frame by metallic plates. I do not, however, confine myself to any specific construction of supplemental frame, as I may vary them as the occasion demands.

I I represent two hinged pins, one connected to each of the arms H H.

J represents the bottom of the dust-collector, which consists of two semicircular sections J' J', each section being provided with female hinges K, mounted on the hinge-pins I I.

L L represent two springs, one connected to the inner side of each of the sections J' J' and to the under side of the frame A, the purpose of the springs being to hold the sections closed tightly against the arms H H H' H' and bottom edges of the sides of the supplemental frame G.

M represents an opening in the bottom J, registering with the opening in the bottom of the supplemental frame G.

G' G' represent two vertically-adjustable bearings slidably held in suitable guides G″ G″, secured to the opposite sides of the supplemental frame G.

G³ G³ represent two adjusting-screws connected to the top of the bearings G′ G′ and projecting through the top g of the supplemental frame G. By means of the adjusting-screws G³ G³ the bearings G′ G′ can be raised or lowered. Journaled in the bearings G′ G′ is an axle g′, and loosely mounted on the axle g′ are two driving-wheels N N³. Loosely mounted on the axle g′ are two disks Z Z′, each of which has an annular flange z extending outwardly from the perimeter of one of its side faces. The inner face of each of the flanges z is provided with a series of ratchet-teeth z′. The inner side face of each of the wheels N N³ is provided with a spring-actuated dog N″. Each of the dogs N″ meshes with the ratchet-teeth z′ of its respective disk. The teeth of the disks Z Z′ are oppositely set to each other, and the dogs N″ are correspondingly set to engage the ratchet-teeth. By means of this construction the wheels N N³ while revolving in one direction will allow the disk Z′ to remain at rest and at the same time cause the rotation of the disk Z by the engagement of the dog N″, carried by the wheel N, with the teeth z′ of the disk Z, and when revolving in the opposite direction will allow the disk Z to remain at rest and cause the rotation of the disk Z′ by the engagement of the dog N″, carried by the wheel N³, with the teeth z′ of the disk Z′. The perimeter of each of the disks Z Z′ is provided with a series of sprocket-teeth W. Each of the hangers C C′ is provided with a bearing O. In one of the bearings O is mounted one journal P of the flexible shaft T of the brush D, and in the opposite bearing O is mounted another journal P′ of the same shaft. The perimeter of each of the journals P P′ is provided with a series of ratchet-teeth Q. In the remaining bearings O are mounted the remaining journals P″ of the flexible shaft T. Passing around the disk Z and journal P is a sprocket-chain S, by means of which motion is imparted to the shaft T and brush D during the revolution of the disk Z. Passing around the disk Z′ and journal P is a chain S′, by means of which motion is imparted to the shaft T and brush D during the revolution of the disk Z′. By arranging the disks to revolve in opposite directions the brush can be caused to revolve centripetally when the sweeper is moving in either direction. The brush consists of a ribbon or band d, of leather or rubber, to which are secured bristles or fibers d′. The ribbon or band is wound spirally on the flexible shaft T, and the ends of the ribbon or band are united to the shaft or journals. By spirally winding the ribbon or band d on the flexible shaft T and uniting the ends of the ribbon or band to the shaft or to the journals of the shaft a continuous or annular brush is formed of sufficient flexibility to yield to the inequalities of the surface over which it is passing and of sufficient rigidity to thoroughly clean it. By raising or lowering the bearings it is possible to draw the wheels into the supplemental frame or press them out to respectively bring the brush closer to the surface over which it is sweeping or farther away from it. By this means the pressure of the brush on the surface being swept can be regulated.

By reference to the drawings it will be noticed that the brush D surrounds the dust-collector and that the hangers and bearings are arranged at equidistant points around the frame. The dust-collector being centrally situated in the sweeper, it necessarily follows that the brushes must sweep toward the center or middle of the sweeper in order that the sweepings can be collected into the dust-collector. By having the brush project beyond the edges of the frame it is possible to sweep out of the corners of a room or hallway and to sweep against the base-board, furniture, or any immovable objects on the floor. The lever or handles $a^4$, by which the carpet-sweeper is operated, is provided with a bail $a^5$, which embraces the axle g′ on the outer side of the supplemental frame G. To provide for the free action of the bail $a^5$, there is sufficient clearance between the top of the frame A and supplemental frame to allow of the bail freely moving in any direction—that is, moving vertically with the vertical movement of the axle or swinging to the front or rear with the axle as its pivot. By this construction the pressure of the handle or lever is wholly upon the axle and driving-wheels N N³, and by pressing the whole pressure of the handle upon the driving-wheels N N³ the brush is relieved from all forces other than imparted from the driving-wheels.

The operation of the invention is as follows: Motion is imparted to the driving-wheels N N³ and from the driving-wheels N N³ to the brush D and shaft T by means of the sprocket-chains S or S′, disks Z or Z′, and journals P or P′. The brush D being annular and revolving about its axis, its motion must of necessity be centripetal—that is, revolving toward the center—and having a centripetal motion it must brush the sweepings toward the centrally-located dust pan or collector. These sweepings coming into contact with the rubber apron are directed upward and carried over the top of the band B into the dust pan or collector, where they are temporarily deposited, being afterward removed by opening the bottom sections and dumping them out.

I do not confine myself to any particular style of brush nor to any particular mechanism for operating the same, as I may use either the construction shown in Figs. 1 and 2 of the drawings or in Fig. 7 of the drawings, or any other suitable construction.

Having thus fully described my invention, what I claim as new, and desire to secure by Letters Patent, is—

1. A carpet-sweeper consisting of a frame a centrally-located dust-collector, and a centripetally-revolving brush or brushes surrounding the dust-collector, substantially as specified.

2. A carpet sweeper consisting of a frame a centrally-located dust-collector, a centripetally-revolving brush or brushes surrounding the dust-collector, and means for revolving the brush, substantially as specified.

3. A carpet-sweeper consisting of a frame a centrally-located dust-collector, a centripetally-revolving brush surrounding the dust-collector, a flexible shaft for the brush, bearings in which is mounted the said shaft, propelling-wheels for the sweeper, and means for imparting motion from the propelling-wheels to the flexible shaft, substantially as specified.

4. A carpet-sweeper consisting of a frame, a dust-collector centrally located in the frame, a centripetally-revolving brush surrounding the dust-collector, propelling-wheels and adjustable bearings for the propelling-wheels, and means for imparting motion from the propelling-wheels to the brush, substantially as specified.

5. In a carpet-sweeper, a frame a dust-collector consisting of a band suspended from the frame of the carpet-sweeper, a flexible apron connected to the edge of the band depending below the brushes, and a sectional bottom hinged to the band, substantially as specified.

6. A carpet-sweeper consisting of a main frame, a supplemental frame centrally located in the under side of the main frame having an open bottom, vertically-adjustable bearings carried by the supplemental frame, adjusting-screws carried by the supplemental frame for adjusting the bearings, an axle journaled on the bearings, propelling-wheels rigidly mounted on the axle-ratchet, disks loosely mounted on the axle and set in opposite directions, spring-actuated dogs carried by the propelling-wheels, sprocket-teeth formed on the ratchet-disks, a dust-collector surrounding the supplemental frame, consisting of a band having an upwardly-extending flange, a rubber apron depending from the band, arms connected to the band and supplemental frame, a bottom hinged to the said arms having an opening registering with the open bottom of the supplemental frame, bearings suspended from the main frame, a flexible shaft mounted in the bearings, a brush woven on a band or ribbon and wound spirally on the flexible shaft, sprocket-teeth carried by the flexible shaft and sprocket-chains passing around the sprocket-teeth of the ratchet-disks and flexible shaft, substantially as specified.

7. In a carpet-sweeper a brush consisting of a flexible core, a ribbon wound on the flexible core, and bristles secured into the ribbon to form a continuous annular brush, substantially as specified.

8. In a carpet-sweeper a dust-collector consisting of a frame, a centrally-located ring suspended from the frame having its outer face beveled, an apron depending from the lower edge of the beveled face, a sectional bottom hinged to the ring, substantially as specified.

9. In a carpet-sweeper a dust-collector consisting of a frame, a centrally-located ring suspended from the frame having its outer face beveled, an apron depending from the lower edge of the beveled face, a sectional bottom hinged to the ring, and springs connected to the bottom sections and to the frame, to normally hold them closed, substantially as specified.

10. In a carpet-sweeper a dust-collector consisting of a frame, a centrally-located ring suspended from the frame having its outer edge beveled, an apron depending from the lower edge of the beveled face, a sectional bottom hinged to the ring, and a band depending from the under side of the frame, having its edge opposed to the top edge of the ring, substantially as specified.

11. In a carpet-sweeper a brush-driving mechanism consisting of a frame, a supplemental frame suspended from the said frame having an open bottom, vertically-adjustable bearings mounted in the supplemental frame, an axle journaled in the bearings, propelling-wheels mounted on the axle, ratchet-disks interposed between the propelling-wheels adapted to work in opposite directions and driven from the propelling-wheels, a flexible shaft journaled in suitable bearings suspended from the frame, and sprocket-chains passing around the disks and flexible shaft, substantially as specified.

Toronto, August 24, 1897.

FRANK P. KEESEE.

In presence of—
C. H. RICHES,
M. A. WESTWOOD.